United States Patent
Conti

(10) Patent No.: US 7,392,631 B2
(45) Date of Patent: Jul. 1, 2008

(54) BLISTERING MACHINE FOR PRODUCING BLISTER PACKS

(75) Inventor: Roberto Conti, Imola (IT)

(73) Assignee: I.M.A. Industria Macchine Automatichie S.p.A., Ozzano Emilla (Bologna) (IT)

( * ) Notice: Subject to any disclaimer, the term of this patent is extended or adjusted under 35 U.S.C. 154(b) by 0 days.

(21) Appl. No.: 11/587,913

(22) PCT Filed: May 6, 2005

(86) PCT No.: PCT/IB2005/001261

§ 371 (c)(1),
(2), (4) Date: Oct. 26, 2006

(87) PCT Pub. No.: WO2005/108208

PCT Pub. Date: Nov. 17, 2005

(65) Prior Publication Data

US 2007/0227099 A1   Oct. 4, 2007

(30) Foreign Application Priority Data

May 7, 2004   (EP)   .................. 04425326

(51) Int. Cl.
*B65B 41/18* (2006.01)
*B65B 9/04* (2006.01)
*B65B 47/00* (2006.01)

(52) U.S. Cl. .............. 53/51; 53/553; 53/559; 53/389.4; 226/30; 493/10

(58) Field of Classification Search .............. 53/51, 53/553, 559, 64, 389.4; 226/27–31; 493/10; *B65B 41/18*
See application file for complete search history.

(56) References Cited

U.S. PATENT DOCUMENTS

| | | | | | |
|---|---|---|---|---|---|
| 3,411,767 | A | * | 11/1968 | Moser et al. | 53/389.4 |
| 3,589,095 | A | * | 6/1971 | James et al. | 53/51 |
| 3,706,175 | A | * | 12/1972 | Anderson | 53/478 |
| 3,706,183 | A | * | 12/1972 | Talarico | 53/329.4 |
| 3,762,125 | A | * | 10/1973 | Prena | 53/51 |

(Continued)

FOREIGN PATENT DOCUMENTS

DE   3201315 A1 *   7/1983

(Continued)

OTHER PUBLICATIONS

Machine translation of description of DE 3201315 A1 from European Patent Office, http://www.worldlingo.com/wl/epo/epo.html?SEED=DE3...Description&OPS=ops.espacenet.com&LOCALE=en_EP&T=1 Mar. 20, 2008 12:12:54 PM, 4 pages.*

*Primary Examiner*—Stephen F Gerrity
(74) *Attorney, Agent, or Firm*—William J. Sapone; Coleman Sudol Sapone P.C.

(57) ABSTRACT

A blistering machine for producing blister packs has a production line, which includes consecutively: at least one thermoforming station of a first continuous band of thermoformable material; a station for feeding the products and filling the blister band; a feeding station of a second band, feeding the second band over the blister band; a closing station, including two opposite rollers; and a cutting station, in which the blister pack band is cut into respective blister packs. A tension mechanism is situated upstream of the closing station, to cooperate with the rollers of the closing station, to perform a selected tension on at least the first band.

2 Claims, 5 Drawing Sheets

U.S. PATENT DOCUMENTS

| | | | | |
|---|---|---|---|---|
| 3,815,322 | A | * | 6/1974 | Wyslotsky .................... 53/559 |
| 3,979,877 | A | * | 9/1976 | Vetter ............................ 53/51 |
| 4,094,127 | A | * | 6/1978 | Romagnoli .................... 53/51 |
| 4,316,566 | A | * | 2/1982 | Arleth et al. ................... 226/2 |
| 4,361,260 | A | * | 11/1982 | Hanlan ........................ 226/30 |
| 4,633,651 | A | * | 1/1987 | Edmunds ..................... 53/435 |
| 4,987,728 | A | * | 1/1991 | Ventura ....................... 53/559 |
| 5,492,465 | A | * | 2/1996 | Matuzawa et al. .......... 425/214 |
| 5,802,821 | A | * | 9/1998 | Albrecht ...................... 53/559 |
| 6,085,490 | A | * | 7/2000 | Buchko ....................... 53/411 |
| 6,666,004 | B2 | * | 12/2003 | Hilbert et al. ................ 53/450 |
| 6,820,399 | B2 | * | 11/2004 | Send ............................ 53/471 |
| 6,843,038 | B1 | * | 1/2005 | Haws ........................ 53/133.4 |

FOREIGN PATENT DOCUMENTS

| | | |
|---|---|---|
| DE | 39 12 054 A1 | 10/1990 |
| DE | 201 18 881 U1 | 6/2002 |
| WO | WO 97/46448 | 12/1997 |

\* cited by examiner

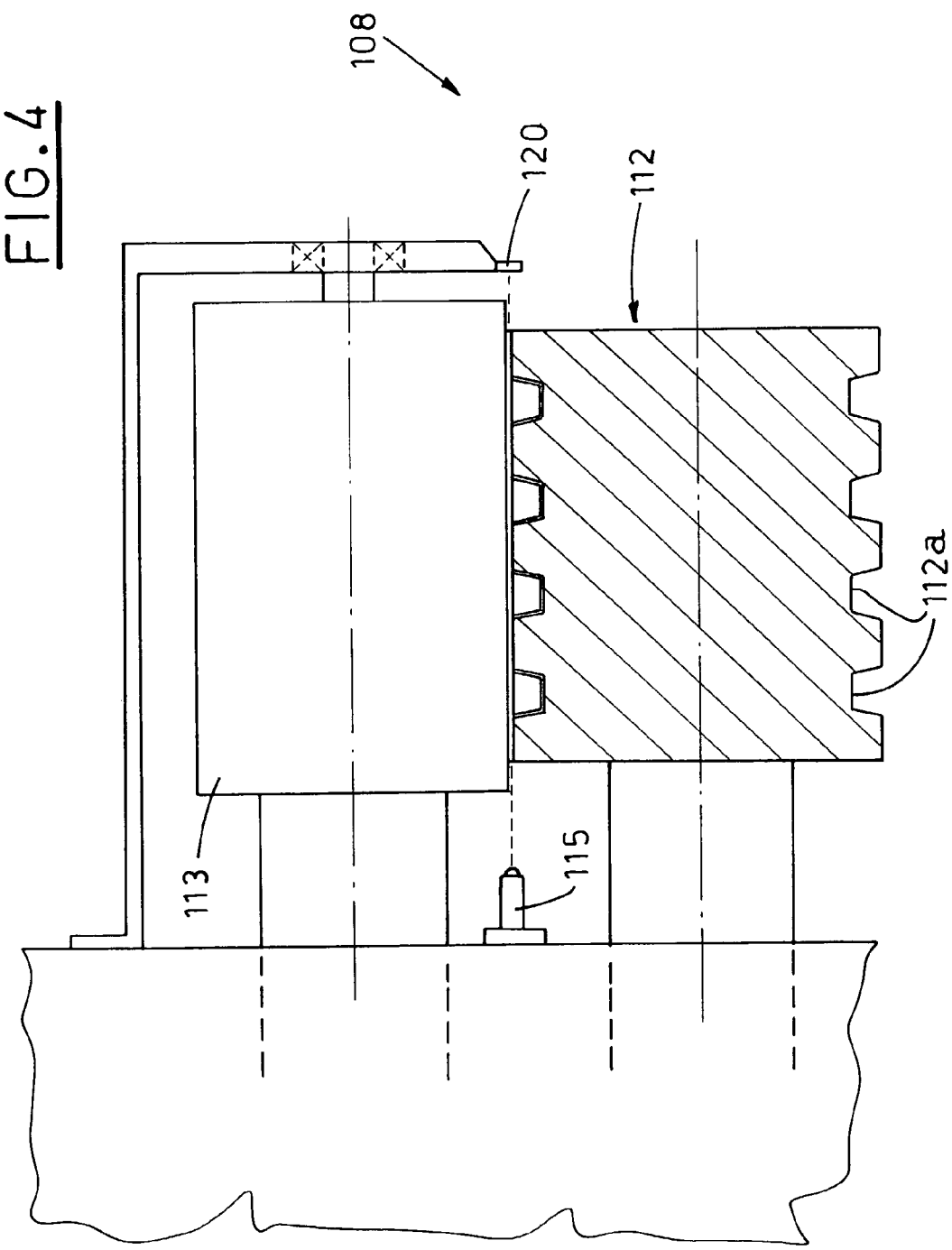

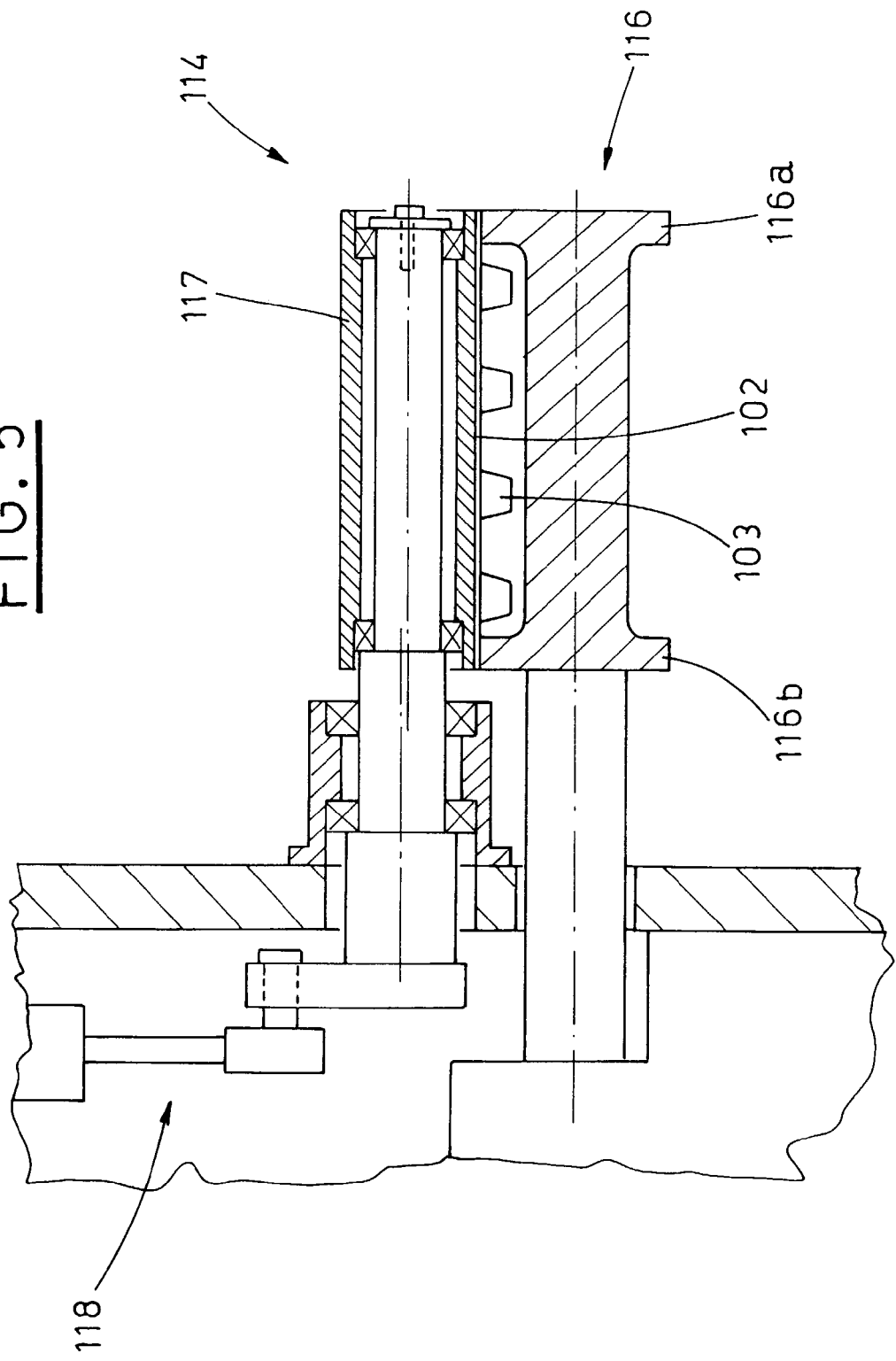

BLISTERING MACHINE FOR PRODUCING BLISTER PACKS

FIELD OF THE INVENTION

The present invention relates to a blistering machine for producing blister packs.

In particular, the invention is advantageously applied in the production of blister packs containing pharmaceutical products, such as tablets, capsules, pills, pellets and the like, to which the following description will refer without loosing its general character.

BACKGROUND OF THE INVENTION

At present, a known blistering machine M for producing blister packs, according to FIG. 1 (prior art) includes: a station 1, in which a first continuous band 2 of thermoformable material (e.g. PVC) is thermoformed to define a blister band with blisters 3 containing products 4, the blister band 2 being fed continuously along a determined feeding path A having a varying course; a station 5 for feeding products 4, having a unit for filling each blister 3 with a relevant product 4; a station 6 for feeding a second continuous band 7 (e.g. aluminium), feeding continuously the second continuous band 7 over the blister band 2 filled with the products 4; a station 8 for closing the first blister band 2 with the second band 7 by heat-sealing, in order to obtain a continuous blister pack band NB.

Downstream of the closing station 8, along the feeding path A with varying route, there is also a station 9, where the continuous blister pack band NB is stamped or punched, and a station 10, where the continuous blister pack band NB is pre-cut, to define pre-cut lines on the continuous blister pack band NB.

Afterwards, the continuous blister pack band NB with the pre-cut lines is divided, e.g. by cutting in a cutting station R, to define a plurality of single blister packs B.

Downstream of the cutting station R, the single blister packs B are withdrawn and fed to a boxing unit C, to be packaged in suitable boxes in known way.

Generally, the closing station 8 has two opposed rollers linked to each other, that is it includes a first, driving lower and recessed roller, that is having circumferential grooves 12a for housing blisters 3 with products 4, and a second roller 13, situated opposite and above the driving roller 12 and provided with heating means, to heat and pressure join the two bands 2 and 7, as they are placed one over the other.

As it can be seen in the machine M of FIG. 1, joining of the two bands, which results in the continuous blister pack band NB, occurs in a tangential line between the opposite rollers 12, 13, while an efficient grip while pulling the blister pack band NB is obtained due to the contact of the blister pack band NB along a wide arc defined on the peripheral surface of the driving roller 12a. The band NB is driven through a bending roller 11 and along an acute angle section of the feeding path A, downstream of the closing station 8 and defining a loop K.

The idler roller 11, defining the loop K and allowing best grip by the driving roller 12 on the band NB, can also oscillate between different working positions, in order to allow to make up for the continuous feeding of the band NB along the path A: this oscillation is necessary, because a continuous feeding of the bands 2 and 7, and consequently of the band NB must match with an operation of the stamping station 9 and the pre-cutting station 10, which in the known blistering machines, occurs in an intermittent way.

SUMMARY OF THE INVENTION

The object of the present invention is to propose a blistering machine, whose structure is simpler and more compact with respect to the known blistering machines, described above, which results in a considerable reduction of dimensions.

In particular, an object of the present invention is to simplify the structure and functionality of the bands closing station, so as to increase the production speed of the whole blistering machine.

Another object of the present invention is to improve the structure of the bands closing station, eliminating the possibility of generating damaging curving of the blister band due to the heat joining of the bands.

A further object of the present invention is to improve the structure of the bands closing station, avoiding the contact between the still hot closing band and the products inside the blisters, during the seal joining.

According to the present invention, a blistering machine for producing blister packs includes a production line, which comprises consecutively at least one thermoforming station of a first continuous band of thermoformable material, in order to define a blister band with blisters containing products; a station for feeding said products and filling said blister band with the latter; a feeding station of a second band, feeding the second band continuously over said blister band filled with the products; a closing station, where the first blister band is sealed by said second band to obtain a blister pack band, said closing station including two opposite rollers; and a cutting station, in which said blister pack band is cut into respective blister packs; the machine being characterized in that said production line extends, at least beginning from said products feeding station, along a continuous feeding path, substantially horizontal, and in that tension means are situated upstream of said closing station, along said path, to cooperate with said rollers of said closing station, to perform a determined tension on at least the first band.

BRIEF DESCRIPTION OF THE DRAWINGS

The technical features of the invention, according to the above objects, are clearly understood from the contents of the claims below, and the advantages of the invention will be better seen from the following detailed description, with reference to the enclosed figures, which show a preferred embodiment, as a pure, not limiting example, in which:

FIG. 4 is a detailed lateral view of a particular of the work station of FIG. 3, with some parts removed; and FIG. 5 is a lateral, section view of a working group, being a part of the work station of FIGS. 3 and 4.

BEST MODES OF CARRYING OUT THE INVENTION

Figure 2:
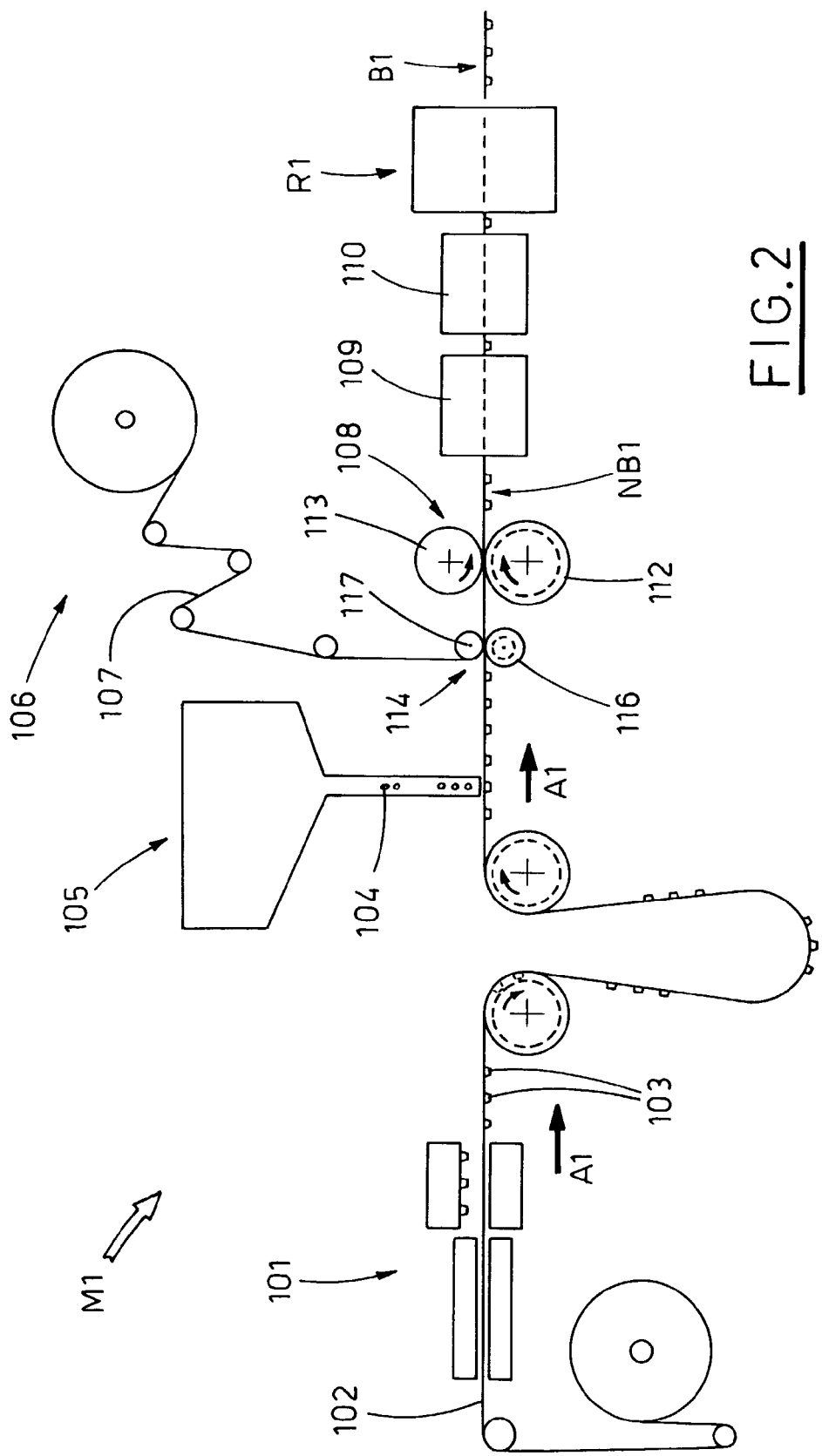
FIG. 2 is a schematic front view of a preferred embodiment of the blistering machine proposed by the present invention.

With reference to FIG. 2, the reference M1 indicates generally a blistering machine proposed by the present invention, for producing blister packs containing products, preferably pharmaceutical.

For simplicity of the description and clarity of the comparison between the machine M1 proposed by the invention and the machine M of the prior art, the constituent elements of the machine M1 shown in FIG. 2 will be described and indicated with reference numbers defined by the same reference numbers (where present and where it is possible) used for describing the machine M, summed to the base number 100: therefore, the number 101 indicates the thermoforming station of the machine M1, which corresponds to the number 1 indicating the thermoforming station of the blistering machine M of the prior art, and so on.

Thus, the blistering machine M1 is defined by a production line including a station 101, where a first continuous band 102 of thermoformable material (e.g. PVC) is thermoformed, so as to obtain a blister band 102 with blisters 103 containing products 104; the blister band 102 being fed in a substantially continuous way along a predetermined feeding path A1; a station 105 for feeding the products 104 having a unit for filling each blister 103 with a relative product 104; a feeding station 106 of a second band 107 (e.g. aluminium), feeding the second band continuously over the blister band filled with the products; a closing station 108, where the first blister band is closed by the second band 107 by heat sealing, to obtain a continuous blister band NB1.

Downstream of the closing station 108, along the linear feeding path A, there is also at least one station 109, where the continuous blister pack band NB1 is stamped or punched, and preferably, a station 110, where the continuous blister band NB1 is pre-cut, to define pre-cut lines on the continuous blister pack band NB1.

Afterwards, the continuous blister pack band NB1 with the pre-cut lines is divided, e.g. by cutting in a cutting station R1, to define a plurality of single blister packs B1.

The stamping station 109 and the pre-cutting station 110 are preferably operated to work continuously on the band NB1, driven continuously, because the stamping/cutting means move continuously from and to the blister band NB1 and following the band NB1.

Downstream of the cutting station R1, the single blister packs B1 are withdrawn and fed to a boxing unit (known and not shown), to be packaged in suitable boxes in known way.

Figure 1:
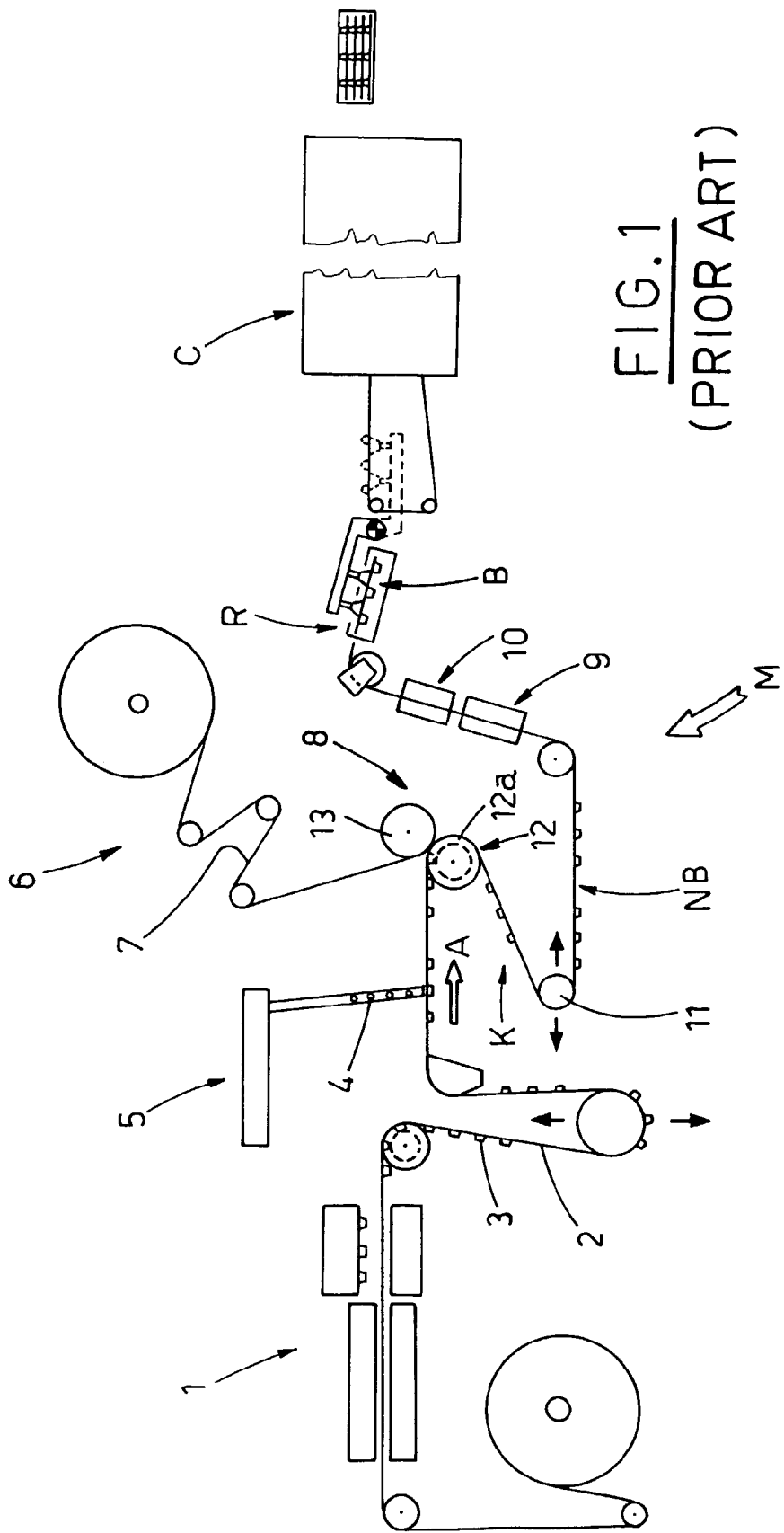
FIG. 1 is a schematic, perspective view of a known blistering machine (Prior Art)

Comparing the machine M1 of FIG. 2 of the present invention with the machine M of the prior art shown in FIG. 1, it is easily seen that while the path A of the machine M has a varying course (note for example curved path at acute angle in a region corresponding to the loop K of the band NB, made by the oscillating bend roller 11), the feeding path A1 of the band 102 in the machine M1 extends horizontally, at least beginning from the station 105 for feeding products 104.

In other words, just a sight allows to understand that the production line of the blistering machine M1 is horizontal, that is it is structured in a simpler and compacter way, and consequently, it reduces considerably dimensions normally occupied by the machine M of the prior art.

Figure 3:
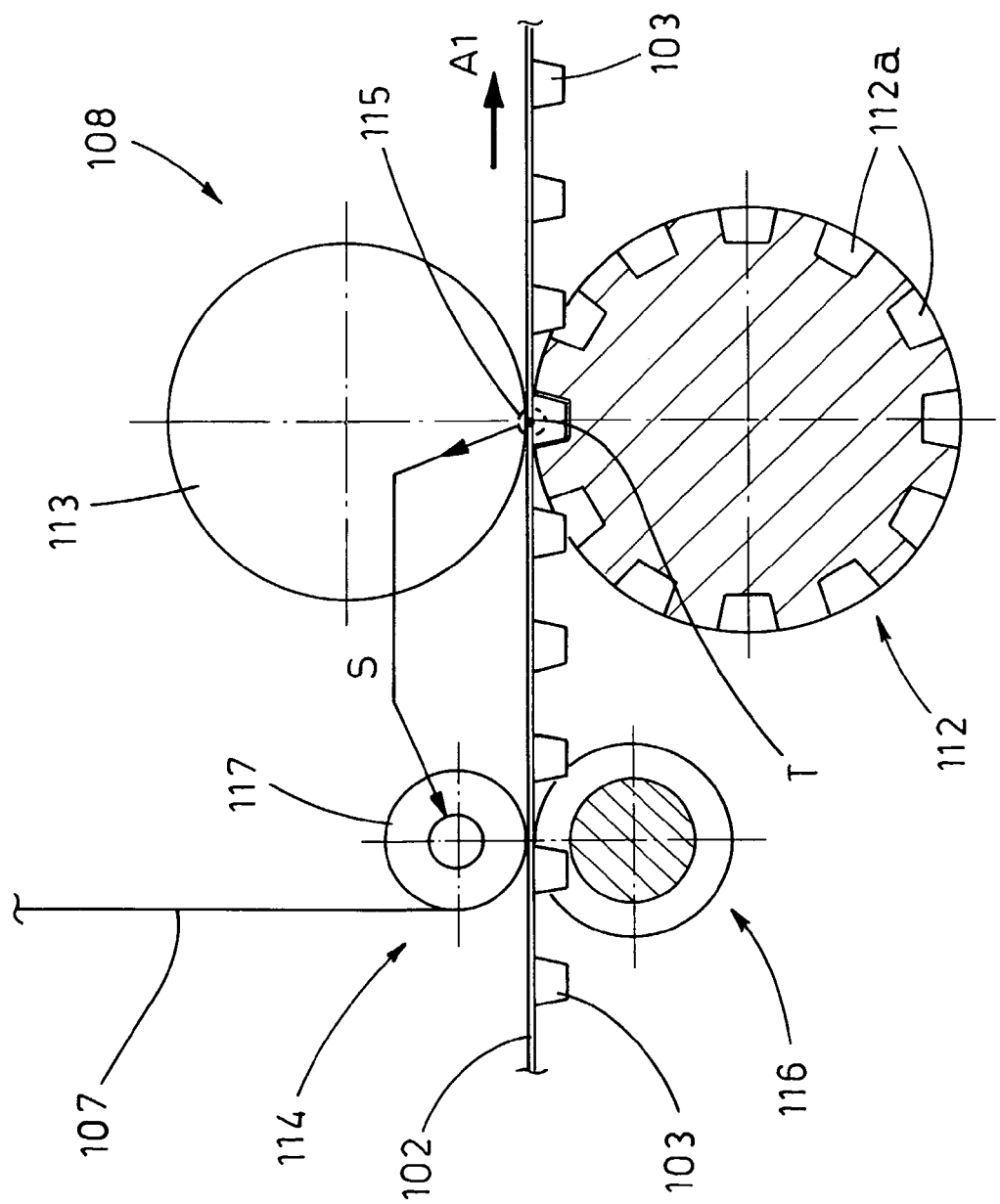
FIG. 3 is a front, partially sectional view, with some parts removed for sake of clarity, of a preferred embodiment of a work station forming an integrating part of the blistering machine schematized in FIG. 2.

According to FIGS. 3 and 4, the closing station 108 for sealing the band 102 with the band 107 has a couple of rollers 112, 113, which are arranged at the opposite side with respect to the bands 102, 107.

The roller 112, situated at the lower level, is a driving roller having recesses 112a for receiving the blisters 3 of the blister band 102, while the upper roller 113, situated opposite the roller 112 and cooperating therewith, is a heated sealing roller.

In particular, it is to be noted that during the feeding along the horizontal path A1, the driving roller 112 is completely coupled with the blister band 102 in a single line corresponding to a line T of contact with the sealing roller 113.

Still according to FIG. 3, upstream of the closing station 108 with respect to the feeding action along the path A1, the machine M1 includes a group 114 for tensioning the bands 102 and 107.

The group 114 allows the pair of bands 102 and 107 to advance horizontally with the best tension, thus allowing an efficient mutual joining of the bands 102, 107 in the station 108, without slipping and with the best gripping and driving action on the blisters 103 by the seats 112a of the roller 112, although the band 102 can adhere to the roller 112 only in a region corresponding to the contact line T.

According to FIGS. 4 and 5, the group 114 includes a pair of rollers 116, 117: the lower roller 116 is a power-driven roller and its cross-section has at least two rings 116a and 116b, holding the edges of the blister band 102.

The roller 116 acts practically as a braking element of the band 102 when it receives a command signal S sent by detecting and control means 115 (FIG. 4), aimed at checking the correct matching between the blister 103 and the housing seat 112a made on the driving roller 112.

The upper roller 117 cooperates with the roller 116 and, in its turn, has pressing means 118 (FIG. 5), which perform a controlled pressure on the power-driven roller 116: in this way it is possible to change the pressure force against the power-driven roller 116.

Still according to FIG. 4, the detecting and control means 115 are arranged in a region corresponding to the driving roller 112 and act in counter-reaction on the tensioning unit 114, so as to allow its activation, that is to generate a braking tension of the band 102, when an erroneous matching seat 112a-blister 113 is detected by means 115.

The means 115 include, preferably but not limiting, an optical sensor 115, situated near the driving roller 112 and acting along the sole seat 112a-blister 103 matching line T.

The sensor 115 is preferably a laser ray emitter, and the ray is reflected by a photocell 120 only in case of erroneous seat 112a-blister 103 matching.

Consequently, the blistering machine M1 structured in this way reaches the objects, due to a simple and efficient structure of the sealing station 108.

The possibility of performing the sealing in only one line of contact of the two rollers and with the bands situated one over the other horizontally, downstream, as well as upstream of the closing station, allows a high final quality of the blister packs, eliminating undesired curving of the blister packs, and a sealing reliability given by the presence of the tensioning/braking unit, which controls the correct passage of bands in real time.

Moreover, the blistering machine proposed by the present invention, having the above described closing station, can produce blister packs with elongated blisters (e.g. for containing capsules), without the necessity to use, in the closing station, driving rollers of multi-faceted peripheral surfaces, which provoke undesired striations on the blister packs and/or damaging contacts between the products and portions of the closing band still hot after the sealing.

Finally, the products feeding in the blistering machine proposed by the present invention is considerably improved and optimized, eliminating damages to the products, due the continuous feeding of the bands with respect to all the working stations, likewise working continuously.

The so conceived invention is susceptible of many changes and variants, all remaining within its inventive concept.

Moreover, all the details can be substituted by technically equivalent elements.

The invention claimed is:

1. A blistering machine for producing blister packs, the blistering machine having a production line which extends along a substantially horizontal continuous feeding path, and comprising:
- at least one thermoforming station for forming blisters in a first continuous band of thermoformable material, thereby defining a blister band with blisters for containing products;
- a station for feeding said products and filling said blisters of said blister band with the products;
- a feeding station for feeding continuously a second band over said blister band filled with said products;
- a closing station for sealing the blister band and said second band together to form a blister pack band, said closing station having two opposed rollers;
- a cutting station for cutting said blister pack band into separate blister packs; and,
- tension means, situated upstream of said closing station along said feeding path, the tension means cooperating with said rollers of said closing station, to perform a determined tensioning on at least said blister band, said tension means including a pair of tensioning rollers, facing each other and situated on the opposite sides of at least said first blister band, at least one tensioning roller being a power-driven roller, said pair of tensioning rollers applying tension on at least said blister band, so as to ensure a correct and complete matching along a seat-blister line determined by at least one blister of said blister band, and a seat provided on one roller of said two opposed rollers of said closing station for receiving said blister therein;
- detecting and controlling means including an optical sensor situated near the power-driven tensioning roller for sensing along said seat-blister matching line, for detecting and controlling the coupling of said blister and said seat, said detecting and controlling means acting to cause a braking of said tension means to generate a braking tension on said first blister band, when said control means detect an erroneous coupling between said seat and said blister.

2. The blistering machine as claimed in claim 1, wherein a cross-section of said power-driven roller of said tension means has at least two rings for holding edges of said blister band, the at least two rings generating the braking tension which is applied to said edges in correspondence to a command signal sent by said detecting and controlling means.

\* \* \* \* \*